United States Patent
Gerards et al.

(10) Patent No.: US 7,849,684 B2
(45) Date of Patent: Dec. 14, 2010

(54) EXHAUST GAS THROTTLE MEANS

(75) Inventors: Hans Gerards, Gangelt (DE); Tobias Wagner, Castell (DE); Stephan Chassée, Neuss (DE)

(73) Assignee: Pierburg GmbH (DE)

( * ) Notice: Subject to any disclaimer, the term of this patent is extended or adjusted under 35 U.S.C. 154(b) by 338 days.

(21) Appl. No.: 11/254,586

(22) Filed: Oct. 20, 2005

(65) Prior Publication Data

US 2006/0096283 A1    May 11, 2006

(30) Foreign Application Priority Data

Oct. 23, 2004    (DE) .................. 10 2004 051 627

(51) Int. Cl.
*F01N 7/00*    (2006.01)

(52) U.S. Cl. .................. 60/324; 60/299

(58) Field of Classification Search ............... 60/324, 60/274, 299
See application file for complete search history.

(56) References Cited

U.S. PATENT DOCUMENTS

| | | | | |
|---|---|---|---|---|
| 2,420,700 A | * | 5/1947 | Curphy | 454/5 |
| 2,960,178 A | * | 11/1960 | De Lorean | 181/238 |
| 3,234,924 A | * | 2/1966 | May | 123/323 |
| 3,921,611 A | * | 11/1975 | Walker | 123/568.29 |
| 4,254,752 A | * | 3/1981 | Friddell et al. | 123/323 |
| 4,707,987 A | * | 11/1987 | Atkin | 60/324 |
| 4,756,155 A | * | 7/1988 | Shinzawa | 60/285 |
| 5,355,673 A | * | 10/1994 | Sterling et al. | 60/324 |
| 5,372,109 A | * | 12/1994 | Thompson et al. | 123/323 |
| 5,406,790 A | * | 4/1995 | Hirota et al. | 60/276 |
| 5,624,100 A | * | 4/1997 | Bolte et al. | 251/65 |
| 5,676,110 A | * | 10/1997 | Meneely | 123/323 |
| 5,975,128 A | * | 11/1999 | Schatz | 137/505.13 |
| 6,179,096 B1 | * | 1/2001 | Kinerson et al. | 188/154 |
| 6,193,214 B1 | * | 2/2001 | Schatz | 251/305 |

FOREIGN PATENT DOCUMENTS

| | | |
|---|---|---|
| DE | 3004343 | 8/1980 |
| DE | 19526144 | 1/1997 |
| JP | 11-013469 | * 1/1999 |

* cited by examiner

*Primary Examiner*—Thomas E Denion
*Assistant Examiner*—Diem Tran
(74) *Attorney, Agent, or Firm*—Ohlandt, Greeley, Ruggiero & Perle, LLP

(57) ABSTRACT

An exhaust gas throttle means for motor vehicles comprises a housing in which an exhaust gas throttle is arranged. The exhaust gas throttle is connected with a throttle shaft which is supported in bearing elements. Inside the housing two stopper elements are provided which are arranged in recesses of the housing to be received in correct positional arrangement.

8 Claims, 1 Drawing Sheet

EXHAUST GAS THROTTLE MEANS

BACKGROUND OF THE INVENTION

1. Field of the Invention

The invention relates to an exhaust gas throttle means for motor vehicles.

2. Description of Related Art

In particular in large-volume vehicle engines comprising, for example six, eight or more cylinders it is common practice to switch off individual cylinders for the purpose of saving fuel. To ensure an adequate backpressure in the exhaust gas tract despite individual switched-off cylinders, exhaust gas throttles are arranged in individual exhaust gas pipes. Such exhaust gas throttle means comprise a housing in which the exhaust gas throttle is arranged. The housing is a tubular housing or part of an exhaust gas pipe such that the exhaust gas throttle is directly installed in the exhaust gas pipe. The exhaust gas throttle is connected with a throttle shaft which is pivotably mounted via at least one bearing element in the housing. To limit the pivoting motion of the exhaust gas throttle, at least one stopper element is provided which limits at least one end position, for example the open position or the closed position. The stopper elements are separate components which are usually manufactured by machining and are then fastened to the inside of the exhaust gas throttle housing. In an end position, the exhaust gas throttle bears upon the stopper element. Since exact definition of the end positions is of great importance, the stopper elements must be installed with great precision.

SUMMARY OF THE INVENTION

It is an object of the present invention to provide an exhaust gas throttle means for motor vehicles, which allows the end position to be exactly defined in a simple manner.

According to the invention, the at least one stopper element of the exhaust gas throttle means is arranged in a recess of the housing. This allows the stopper element to be received in correct positional arrangement. Preferably, this recess is a continuous recess such that the stopper element can be installed from outside and can possibly be fixed to an outside of the housing. This considerably facilitates the installation process. Since in particular modern manufacturing processes allow precise recesses to be produced in the housing, which preferably is a metal tube, the position of the at least one stopper element is exactly defined.

In a particularly preferred embodiment of the exhaust gas throttle means, the stopper element is connected with the bearing element. This offers the advantage that during installation of the bearing element the one or preferably two stopper elements can be installed, too. Preferably, the at least one stopper element is integrally formed with a component of the bearing element. In particular, the stopper element is integrally connected with a bearing sleeve or a bearing housing. This offers the advantage that the number of components is reduced and thus the installation effort is decreased.

Provision of continuous recesses in the housing allows the bearing element to be arranged outside the housing, wherein the stopper elements are configured such that they project through the housing into the inside of the housing. In the end positions, the exhaust gas throttle bears upon the stopper elements. It is possible to provide only one stopper element which preferably defines the open position. In this embodiment, the closed position is defined by the exhaust gas throttle bearing upon the inner wall of the housing. In this case, the exhaust gas throttle may be configured such that, even in a slightly inclined position, the throttle completely bears upon the housing inner wall such that the exhaust gas throttle is not allowed to rotate perpendicularly to the housing.

The stopper element is preferably of partially circular configuration. The recesses preferably have the same shape as the stopper element. The size of the stopper element and/or its position are preferably such that an exhaust gas throttle extends, in an open position, in longitudinal direction of the housing and thus offers the largest housing cross-section possible. It is further possible to configure and/or arrange the stopper elements such that the exhaust gas throttle has, for example at a maximum angle of opening, an angle of 70° relative to the closed position.

BRIEF DESCRIPTION OF THE DRAWINGS

Hereunder a preferred embodiment of the invention is explained in detail with reference to the appended drawings in which.

DETAILED DESCRIPTION OF THE PREFERRED EMBODIMENTS OF THE INVENTION

Figure 1:
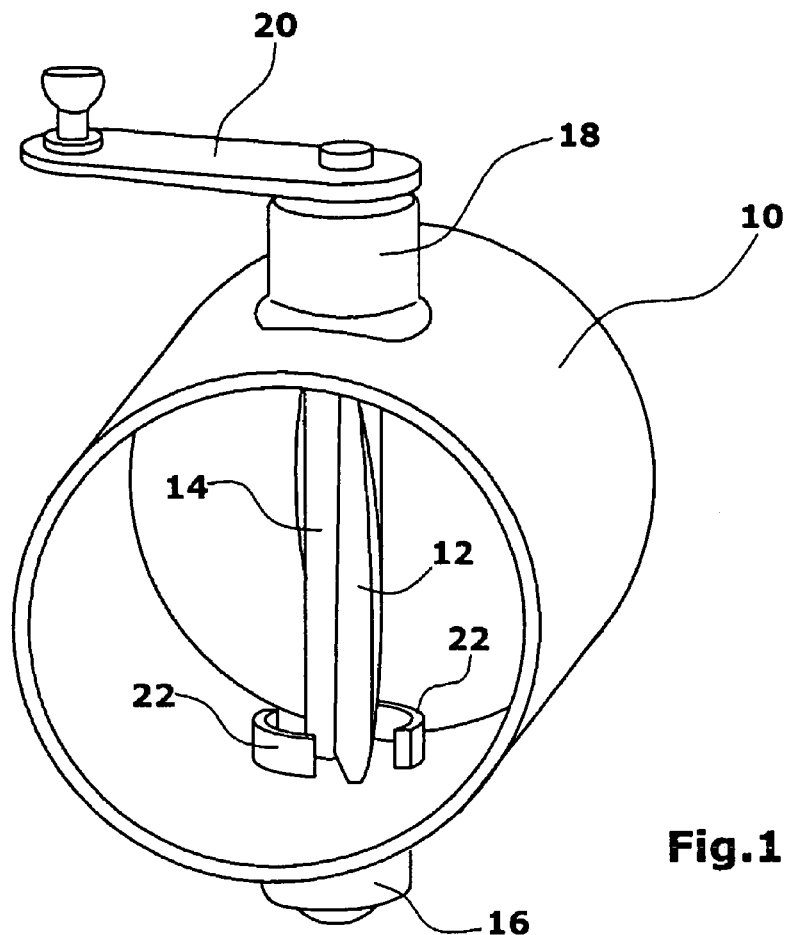
FIG. 1 shows a schematic perspective view of the exhaust gas throttle means.
Figure 2:
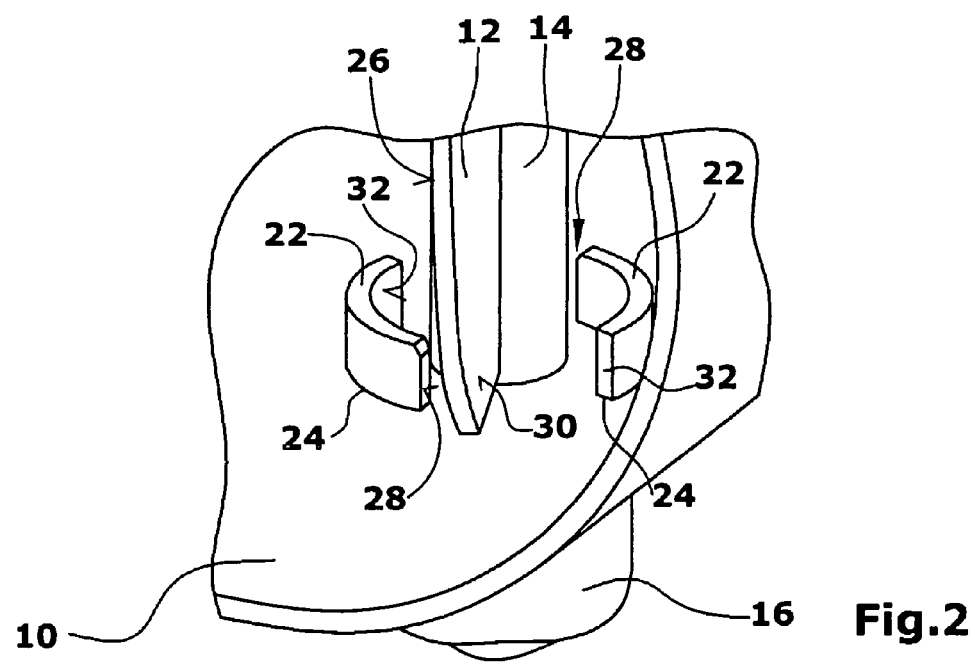
FIG. 2 shows an enlarged view of the area of the stopper elements.

The exhaust gas throttle means according to the invention comprises a housing 10. Inside the housing 10 an exhaust gas throttle 12 is arranged which is fixedly attached to a throttle shaft 14. The throttle shaft 14 is supported by bearing elements 16,18 arranged outside the housing 10. In the illustrated embodiment, the shaft 14 has connected thereto a lever 20. The lever 20 can, for example, be connected via a link with an actuator for the purpose of pivoting the throttle shaft 14.

The bearing element 16 comprises a bearing sleeve having projections which are shaped like circular ring segments and serve as stoppers 22. The stoppers 22 are inserted, through recesses 24 arranged in the housing 10, in the inside of the housing.

When the exhaust gas throttle 12 is pivoted into an open position, a side surface 26 of the exhaust gas throttle 12 is pressed against edges 28 of the two stopper elements 22. In the closed position, the opposite side 30 of the exhaust gas throttle 12 is pressed against stopper surfaces 32.

Although the invention has been described and illustrated with reference to is specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. An exhaust gas throttle means element for motor vehicles, comprising:
    an exhaust gas throttle flap arranged in a housing,
    a throttle shaft connected with the exhaust gas throttle flap, said throttle shaft being supported in at least one bearing element connected with the housing, and
    at least one stopper element for directly limiting the pivoting motion of the exhaust gas throttle flap in an end position so that the gas throttle flap is pressed against an edge of the stopper element in the end position, wherein the housing comprises an opening for receiving the stopper element in correct positional arrangement, wherein the stopper element extends through the opening into the inside of the housing, and wherein the stopper element is connected with the bearing element.

2. The exhaust gas throttle element according to claim 1, wherein the bearing element is arranged outside the housing.

3. The exhaust gas throttle element according to claim 1, wherein the stopper element is configured as a circular ring segment.

4. An exhaust gas throttle element for motor vehicles, comprising:
   an exhaust gas throttle flap arranged in a housing,
   a throttle shaft connected with the exhaust gas throttle flap, said throttle shaft being supported in at least one bearing element connected with the housing, and
   at least one stopper element for directly limiting the pivoting motion of the exhaust gas throttle flap in an end position so that the gas throttle flap is pressed against an edge of the stopper element in the end position,
   wherein the housing comprises an opening for receiving the stopper element in correct positional arrangement, wherein the stopper element extends through the opening into the inside of the housing, and wherein the stopper element is connected with at least one of a bearing sleeve and a bearing housing of the bearing element.

5. An exhaust gas throttle means element for motor vehicles, comprising:
   a housing having a recess;
   a bearing element arranged outside the housing, the bearing element having a bearing sleeve with a projection having a first edge and a second edge;
   a throttle shaft in the housing and supported by the bearing element; and
   an exhaust gas throttle flap having a first surface and a second surface, the exhaust gas throttle flap being in the housing and connected with the throttle shaft, wherein the projection extends through the recess into the housing so that the first surface is pressed against the first edge when the exhaust gas throttle flap is pivoted into an open position and the second surface is pressed against the second edge so that when the exhaust gas throttle flap is pivoted into a closed position.

6. The exhaust gas throttle element according to claim 5, wherein the stopper element is configured as a circular ring segment.

7. The exhaust gas throttle element according to claim 5, further comprising a lever connected to the throttle shaft.

8. The exhaust gas throttle element according to claim 5, wherein the bearing element has a pair of bearing sleeves each including a projection with a first edge and a second edge.

\* \* \* \* \*